Figure 1:
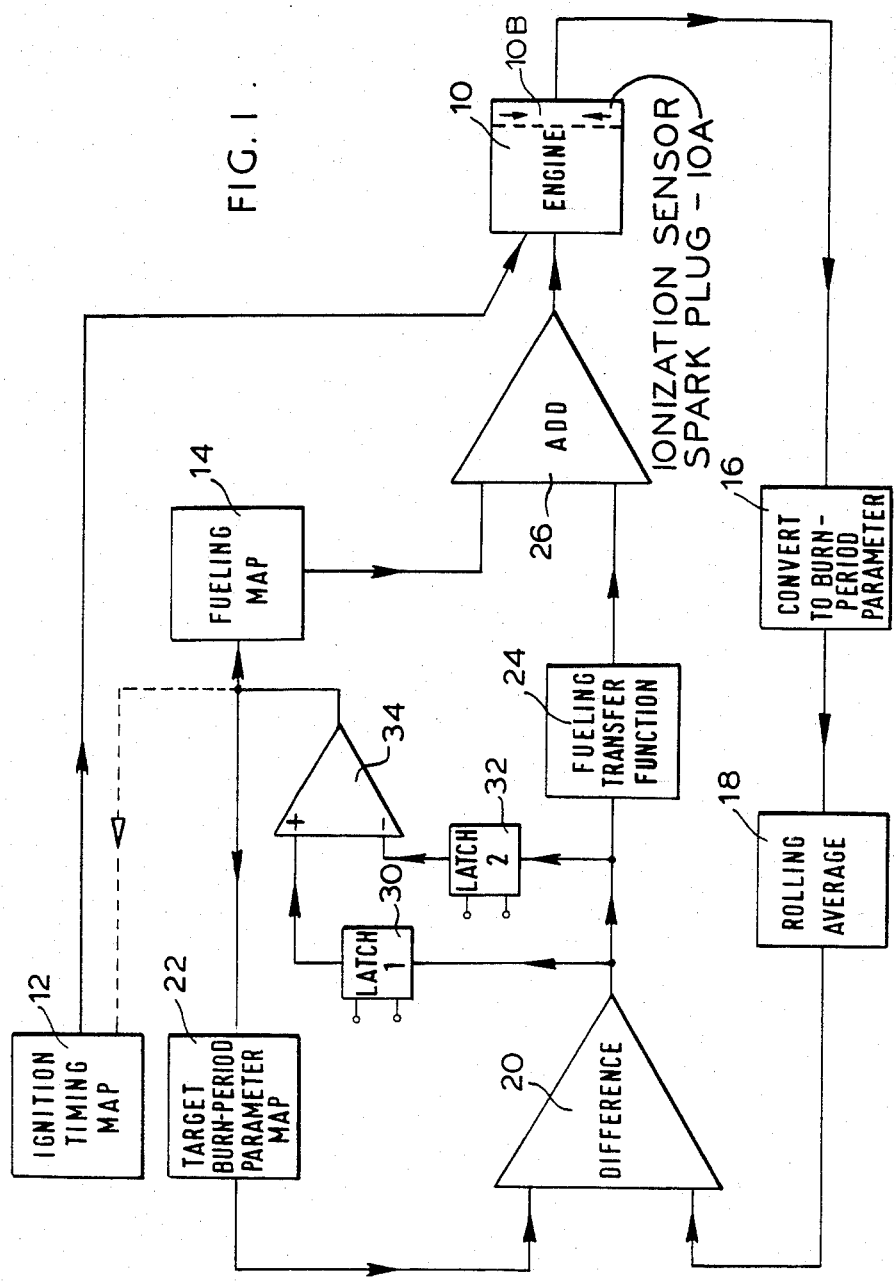

United States Patent [19]

Ma

[11] Patent Number: 4,535,740
[45] Date of Patent: Aug. 20, 1985

[54] ENGINE CONTROL SYSTEM

[75] Inventor: Thomas T. Ma, Chelmsford, United Kingdom

[73] Assignee: Ford Motor Company, Dearborn, Mich.

[21] Appl. No.: 615,632

[22] Filed: May 31, 1984

[30] Foreign Application Priority Data

Jun. 3, 1983 [GB] United Kingdom ............... 8315221

[51] Int. Cl.³ ............................................. F02D 37/02
[52] U.S. Cl. ................................. 123/435; 123/425; 123/486
[58] Field of Search ............... 123/435, 425, 480, 486, 123/416, 417

[56] References Cited

U.S. PATENT DOCUMENTS

| 4,130,097 | 12/1978 | Ford ............................ | 123/425 |
| 4,216,750 | 8/1980 | Kobayashi ...................... | 123/435 |
| 4,304,203 | 12/1981 | Garcea et al. .................. | 123/425 |
| 4,314,534 | 2/1982 | Nakajima et al. ................ | 123/435 |
| 4,377,140 | 3/1983 | Latsch .......................... | 123/425 |
| 4,417,556 | 11/1983 | Latsch .......................... | 123/425 |
| 4,465,046 | 8/1984 | May ............................. | 123/425 |

Primary Examiner—Andrew M. Dolinar
Attorney, Agent, or Firm—Peter Abolins; Robert D. Sanborn

[57] ABSTRACT

The invention describes a control system in which open loops control the mixture strength and spark timing by means of look-up tables (14, 12) stored in a computer and a closed loop (16, 18, 20, 24) with much greater response time corrects the air fuel ratio to compensate for long term drift in the open loops under the control of an ionization sensor sensitive to the duration of the burn period. The ionization sensor output is used only in operating ranges where its output accurately reflects the burn period duration.

Consequently, the high speed response of an open loop is achieved at the same time as the long term stability of a feedback loop sensitive to the burn period duration.

3 Claims, 1 Drawing Figure

ENGINE CONTROL SYSTEM

The present invention relates to an internal combustion engine in which the ignition and the fuel-to-air ratio are determined by tables stored in a microcomputer the tables providing predetermined settings of the ignition timing and the fuel to air ratio in dependence upon sensed parameters and in which a closed loop control circuit incorporating an ionisation sensor disposed within a combustion chamber is provided for applying a correction to one of the signals derived from the tables stored in the microcomputer in dependence upon the sensed burn period duration. Such an ionisation sensor may be used to measure the flame propagation speed or the time of arrival of the flame at the sensor or any other parameter indicative of the duration of the burn period.

Various systems have been proposed in the past in which an ionisation sensor, constituted by a pair of electrodes, is arranged within the combustion chamber to sense the arrival time of the flame and this signal is used in a feedback loop to control the ignition timing in such a manner that the peak pressure developed within the combustion chamber corresponds with a predetermined cranking angle.

Such systems have serious problems which prevent accurate control over the full range of engine operating conditions. In particular, the ionisation sensor is unreliable during certain conditions such as accelleration, decelleration and low load operation. Furthermore, thre response time of the sensor and of the control feedback loop must be very fast over the full engine speed range and the amount of data processing required is difficult to achieve in real time. Because of this, the feedback control of the engine can only match the efficiency of a well calibrated open loop engine system is steady state conditions and will tend to give incorrect settings of the ignition timing or the fuel to air ratio when operating in regions where the ionisation sensor is unreliable or under extreme load conditions.

A feedback system does, however, have the advantage of not requiring frequent recalibration this being a disadvantage of an open loop calibrated system in which the ignition timing and air to fuel ratio are merely varied in dependence upon sensed parameters such as the engine speed, manifold pressure and throttle valve position.

The present invention seeks to provide a system which has the advantages of an open loop system in terms of the speed of reaction to changing engine operating conditions but which does not require frequent recalibration.

According to the present invention, there is provided an internal combustion engine in which the ignition and the fuel-to-air ratio are determined by tables stored in a microcomputer the tables providing predetermined settings of the ignition timing and the fuel to air ratio in dependence upon sensed parameters and in which a closed loop control circuit incorporating an ionisation sensor disposed within a combustion chamber is provided for applying a correction to one of the signals derived from the tables stored in the microcomputer in dependence upon the sensed burn period duration, characterised in that the closed loop applies a correction to the signal for regulating the fuel-to-air ratio and has a response time substantially greater than the response time of the open loop, and in that changes in the correction effected by the closed loop are permitted only when the engine is operating within a predetermined range for which the operation of the ionisation sensor is accurately representative of the burn period duration.

Though the closed loop system is unreliable under many conditions, during steady state conditions it can provide control matching the efficiency of a well calibrated open loop. The invention in its broadest aspect applies a correction to the open loop only to correct for steady state conditions and this correction is latched for substantial periods as compared with the response time of the open loop. In this way, the speed of reaction of the open loop is not lost yet any tendency for the calibration of the open loop to drift is corrected by the closed loop. Care is taken, however, to ensure that the readings of the burn period are accurate and that they are averaged over a number of engine cycles.

It is possible in modern petrol engines and with the advances made in microprocessors to control the ignition timing to a high precision by digital storage of a set of calibrated values in a look-up table or ignition map, the values being optimised for different speed and load conditions. The table may then be called up as the values of these parameters change and the values stored in the table used to set the ignition system. In this way, once the system is installed accurately in the factory, it will remain accurate and consistent.

Fueling control, on the other hand, depends heavily on analogue calibration of several measurements such as air flow, air density, fuel delivery rate, etc. all of which are subject to systematic errors, changes in ambient conditions, long term deterioration and variation in fuel quality.

The main reason for ignition timing errors lies in the uncontrolled variations in the fueling which in turn alter the ignition requirements and invalidate the original ignition map calibration. It is possible to use closed loops to control either or both of the ignition timing and and the fueling. In the invention, however, the ignition timing is assumed to be correct and the fueling is controlled by feedback to compensate for long term drift.

The information derived from the burn period sensor is expressed in the form of timing information and in the past it has been thought logical to use the information to vary ignition timing. However, the timing is not subject to error, as previously mentioned, and therefore such adjustment tries to balance out errors rather than rectify them. In other words, the feedback system in varying the ignition timing may bring the peak pressure to the desired cranking angle but the engine will still be working outside the calibrations in the tables of the microcomputer. In the invention, on the other hand, the timing is already in conformity with the calibration established under test bed conditions and the feedback system ensures that the fueling is also returned to the test bed conditions.

In the preferred embodiment of the invention, predetermined stored maps are used to control fuel to air ratio and the ignition setting but the map controlling the fueling has its origin or other datum point altered by the closed feedback loop to correct for any long term drift in the correct setting.

The above method of control suffices to correct for any drift the effect of which is merely to raise or lower the map without distorting the shape of the map in any other way. Such control, however, is unsatisfactory for any parameter such as the quality of the fuel being burnt which not only alters the reference point on the map but also distorts the map. In such a case calibration effected only within a narrow range of operating conditions is not capable of sensing such any irregularity.

In order to overcome this problem, it is preferred to compare the open and feedback loop settings at spaced points in the fueling or ignition map in order to sense changes in fuel quality. If for example after the datum point has been selected such that the setting provided by the closed loop system and the open loop system agree under some operating conditions it is found that they disagree under other conditions, it may be deduced from this that the map is no longer appropriate for the quality of fuel burnt and in response to such detection the open loop system may revert to a different map corresponding to a different quality of the fuel. The closed loop control system still only applies corrections to the open loop system under steady state operating conditions but it also monitors the setting provided by the open loop system under other operating conditions to detect if the quality of fuel burned corresponds with that assumed for the memory map in question.

It has been proposed earlier that the spark plug may itself be used as an ionisation sensor since its impedance measured across the gap after ignition has taken place follows a waveform which is believed to be related to the timing of the peak pressure developed in the cylinder. This signal cannot be relied upon under all operating conditions because in some cases the signal to noise ratio is such that the signal cannot be distinguished with certainty from the ambient noise.

In the present invention, however, because the control loop system is only required to provide for recalibration of an open loop system when its own operation is known to be reliable, it suffices to use the spark plug itself as an ionisation sensor.

The invention will now be described further, by way of example, with reference to the accompanying drawing, which shows a closed loop fuel control circuit of the invention.

In the drawing 1 there is shown a control circuit employing open loop fuel control and open loop timing control with the operation of the open loop for the fuel control monitored and corrected by a slower closed loop.

The engine 10 receives spark timing information from a timing map 12, it being appreciated that this map is constituted by a stored program in a micro-computer which controls both the ignition timing and the fueling.

In like manner, the fuel-to-air ratio is controlled by a fueling map 14 which sets the otpimum fuel to air ratio for different engine speed and load conditions as sensed by appropriate sensors, such as vacuum gauges and shaft encoders. Under the ideal conditions, that is to say the conditions for which the fueling map is calibrated, there is no further correction necessary and the signal from the fueling map 14 suffices to control the fuel to air ratio applied to the engine. However, for different reasons, the optimum fueling may drift and though the general shape of the map stored in the micro-computer may still be applicable, the origin of the map may change.

In other words, a change in atmospheric pressure or another ambient condition may necessitate adding a correction signal to the value derived from the table, this correction signal remaining constant over the full range of operating conditions.

In order to correct for such long term drift in the accuracy of the fueling map, an ionisation sensor connected to the engine provides an signal which is converted in a suitable manner, known per se, into a parameter indicative of the duration of the burn period, such conversion being undertaken within the block designated 16. The method employed may rely upon the time of arrival of the flame front at a sensor or upon a direct measure of speed propagation or upon a maximum reading from a pressure sensor, but the method will not be described in the context of the present invention since the invention can be put into practice by means of any burn period sensitive sensor arranged within the combustion chamber.

The actual burn period is averaged in a block designated 18 and applied to a differential amplifier 20 which receives a second signal which sets the target value for the duration of the burn period under the sensed operating conditions. The burn period target value is applied as a second input to the differential amplifier 20 from a further map 22 in the micro-computer. When there is a long term drift in the fueling map, a signal will appear at the output of the differential amplifier 20. After passing through a fueling transfer function circuit 24 this signal applies an off-set to a summation amplifier 26 which thereby alters the reference value for the signals received from the fueling map 14, effectively changing the origin of the stored map.

The fueling map enables the air to fuel ratio to be adjusted constantly and at high speed in dependence upon the sensed operating conditions. Thus, the system has the benefit of the speed afforded by an open control loop. The drift correction is applied by means of a slow loop and this is achieved by comparing the burnt period as sensed by an ionisation sensor with an optimum burn period under the various operating conditions.

The burn perod measurement by the ionisation sensor is not, however, reliable under all operating conditions and consequently the micro-computer only permits the offset control signal applied to the summation amplifier 26 to be varied when the operating conditions are such that the burn period measurement by the ionisation sensor may be relied upon. Under all other conditions, the last prevailing offset control applied to the summation amplifier 26 is maintained constant.

It has been assumed in the above description that the errors which occur in fueling can be corrected exclusively by the addition or subtraction of a constant that is to say by merely raising the values stored in the map relative to the reference axis. Though this applies to such variations as caused by atmospheric pressure and humidity, and changes in the compression ratio due to a build up of carbon in the cylinders or engine wear, they do not apply when the quality of the fuel being burnt is changed for any reason since the optimum map for any grade of fuel depends on its octane rating.

Consequently, it is preferable to be able to detect that the fuel being burnt differs from that for which the fuel map is calibrated and this may conveniently be effected by comparing the different signals prevailing at the output of the differential amplifier 20 under two different sets of operating conditions. If the fuel being burnt is correct, then the correction required as indicated by the differential amplifier output should be constant over the full operating range of the engine. However, if different corrections are indicated at different operating conditions this may be sensed and used to indicate to the computer that the fuel differs from the fuel apertaining to the calibration in the fueling map and the burn period map.

In the described embodiment, latches 30 and 32 are provided which are operative to latch the values of the correction signal at the output of the differential amplifier 20 under two different sets of operating conditions for example under two different engine speeds and if the stored values in the two latches differ from one and other to a sufficient extent, this is sensed by a further differential amplifier 34 which now applies a signal to the computer to instruct a change of the fueling map and a change of the target burn period map. In this way, it is possible to correct for changes in operating conditions which only necessitate a change in the origin of the same map and also to allow the selection of a more appropriate ignition and target maps in response to the change in the fuel quality which requires more than a change to the origin of the fueling map stored in the micro-computer.

If a different fuel grade is indicated by the output of the differential amplifier 34, it is possible if desired additionally to alter the ignition timing map by the same micro-computer the final limitation on the level of control being placed by the total amount of information which is capable of being stored within the memory of the micro-computer.

It will be seen that only the fueling is controlled by means of a slow feed back loop while no attempt is made to correct the ignition timing. By applying such feedback control one can for the reasons discussed previously achieve absolute calibration rather than optimisation by playing off errors against each other.

It has been proposed earlier that the spark plug 10A may itself be used as an ionisation sensor since its impedance measured across the gap 10B after ignition has taken place follows a waveform which is believed to be related to the timing of the peak pressure developed in the cylinder. This signal cannot be relied upon under all operating conditions because in some cases the signal to noise ratio is such that the signal cannot be distinguished with certainty from the ambient noise. In the embodiments of the invention described, because the control loop system is only required to provide for recalibration of an open loop system when its own operation is known to be reliable, it suffices to use the spark plug itself as an ionisation sensor.

There are severals possible causes for the output of the sensor not correctly representing the burn period duration. A first reason is mentioned above, namely that the signal to noise ratio within certain bands of the speed-load map is too low to provide reliable readings. Another reason is that the signal will in practice be averaged over several cycles and such averaging inherently assumes that the operating conditions have remained steady during all the averaged readings. If therefore readings are averaged during transients such as heavy acceleration and deceleration, then the computed average is misleading. All such conditions are indicated by the position on the speed-load map and detecting such conditions can therefore be effected without additional hardware. In particular, the software may implement a test to ensure that the sensed load and speed fall within certain specified areas of the map before permitting alteration of the closed loop correction signal, and if the operating point lies outside such areas then the last evaluated correction is latched until reliable readings from the sensor are again available.

The invention has been described by reference to a fuel injected engine but this is not essential, and one may instead emply a carburettor which permits the fueling to be altered under the control of an electrical control signal.

I claim:

1. An internal combustion engine in which the ignition timing and the fuel-to-air ratio are determined by an open loop control system including tables (12,22,14) stored in a microcomputer, the tables providing signals indicating predetermined settings of the ignition timing and the fuel to air ratio in dependence upon sensed parameters and in which a closed loop control circuit (16,18,20,24) incorporating an ionisation sensor disposed within a combustion chamber is provided for sensing a burn period duration and applying a correction to one of the signals derived from the tables stored in the microcomputer in dependence upon the sensed burn period duration, characterised in that the closed loop applies a correction to the signal for regulating the fuel-to-air ratio and has a response time substantially greater than the response time of the open loop, and in that changes in the correction effected by the closed loop are permitted only when the engine is operating within a predetermined range for which the operation of the ionisation sensor is accurately representative of the burn period duration.

2. An engine as claimed in claim 1, wherein several alternative tables are stored in the microcomputer and means are provided for latching the correction signal under different engine loads and speeds and comparing the latched off-sets, the table selection being changed in response to an excessive difference between the latched values, whereby to select maps more appropriate to the prevailing burning characteristics of the fuel.

3. An engine as claimed in claim 1 or 2, characterised in that the ionisation sensor is constituted by the spark plug of a cylinder, means being provided to monitor the impedance of the plug gap immediately after ignition has taken place.

* * * * *